United States Patent [19]

Ilardo

[11] 3,859,371
[45] Jan. 7, 1975

[54] HALOGENATED NORBORNENE - METHANONAPHTHALENE COMPOUNDS

[75] Inventor: Charles S. Ilardo, Tonawanda, N.Y.

[73] Assignee: Hooker Chemicals & Plastics Corp., Niagara Falls, N.Y.

[22] Filed: Sept. 16, 1969

[21] Appl. No.: 858,536

[52] U.S. Cl. ......... 260/648 C, 260/648 F, 260/45.7
[51] Int. Cl. ............................................. C07c 17/00
[58] Field of Search ......... 260/648 F, 648 C, 649 F, 260/649 R

[56] References Cited
UNITED STATES PATENTS

| | | | |
|---|---|---|---|
| 2,799,614 | 7/1957 | Mark | 260/648 C |
| 2,900,377 | 8/1959 | Fields | 260/139 |
| 2,952,710 | 9/1960 | Fields | 260/648 C |
| 2,952,711 | 9/1960 | Roberts | 260/649 R |
| 3,050,567 | 8/1962 | Schmerling | 260/648 C |
| 3,201,484 | 8/1965 | Myers et al. | 260/666 |

FOREIGN PATENTS OR APPLICATIONS
6,811,192  2/1969  Netherlands

OTHER PUBLICATIONS
Ziegler et al., Chem. Abstracts 49, 13076d–13079c (1955).

Primary Examiner—Daniel D. Horwitz
Attorney, Agent, or Firm—Peter F. Casella; James F. Mudd

[57] ABSTRACT

Novel compositions of matter having the following structural formula:

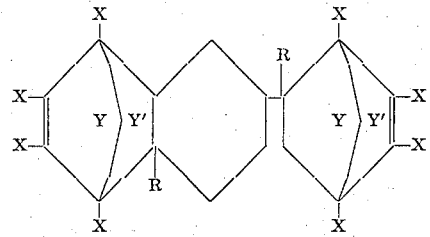

where X is halogen; Y and Y' are each selected from the group consisting of halogen, lower (1-4C) alkyl, lower (1-4C) alkoxy, and halogen substituted lower (1-4C) alkoxy and alkyl radicals; and R is selected from the group consisting of H, lower (1-4C) alkyl, and halogen radicals.

4 Claims, No Drawings

HALOGENATED NORBORNENE - METHANONAPHTHALENE COMPOUNDS

These compositions, which are especially useful as fire retardant additives in normally flammable thermoplastic materials, are prepared by reacting, in ratio, two moles of a composition having the formula:

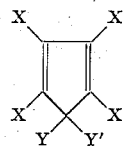

where X is halogen; and Y and Y' are each selected from the group consisting of halogen, lower (1-4C) alkyl, lower (1-4C) alkoxy, and halogen substituted lower (1-4C) alkyl and alkoxy radicals with one mole of a composition having the formula:

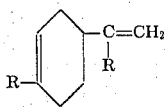

where R is selected from the group consisting of H, lower (1-4C) alkyl, and halogen radicals.

BACKGROUND AND SUMMARY OF THE INVENTION

This invention relates generally to novel compositions of matter which may be generically identified as halogenated norbornene (norbornenyl methanonaphthalene) derivatives. Such compositions have been found to have useful properties, particularly as flame retardant additives for normally flammable thermoplastic materials. These flame retardant additives, when blended with the thermoplastic resin prior to molding, extruding, or the like, are stable at normal processing temperatures and do not discolor the plastic or have an adverse effect on the flow characteristics thereof. Consequently, the use of the subject compositions as flame retardants has solved many of the problems which have heretofore been associated with previously known flame retardants. The latter, in many instances have been incompatible with certain polymeric materials and have often down graded the fabricating capabilities of plastic.

In general, the compositions to be described in more detail below have the general structural formula:

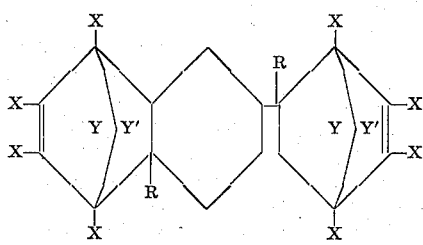

where X is halogen, preferably Cl, Br, or F; Y and Y' are each selected from the group consisting of halogen, lower (1-4C) alkyl, lower (1-4C) alkoxy, and halogen substituted lower (1-4C) alkyl and alkoxy radicals; and R is selected from the group consisting of H, lower (1-4C) alkyl, and halogen radicals.

In a preferred embodiment, these products are obtained by a Diels-Alder reaction in which two moles of a halogenated cyclopentadiene are reacted with one mole of a composition having the formula:

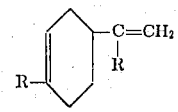

where R is selected from the group consisting of H, lower (1-4C) alkyl radicals, and halogen radicals.

Examples of the latter are 4-vinylcyclohexene (a dimer of butadiene), 4-($\alpha$-chlorovinyl)-1-chlorocyclohexene (a dimer of chloroprene), and d,1-limonene (dipentene, a dimer of isoprene).

With reference to the background and state of the art of compositions of this general character, reference is made herein to an article by H. E. Ungnade and E. T. McBee entitled, "The Chemistry of Perchlorocyclopentenes and Cyclopentadienes"; *Chemical Reviews* 58(2), 249–320 (1958). This article covers in detail a large number of Diels-Alder adducts prepared from the reaction of halogenated cyclopentenes and cyclopentadienes with various dienophiles. There is, however, no reference in the article to any class of Diels-Alder adducts prepared with two moles of halogenated cyclopentadiene with the dienophile. Moreover, all of the dienophiles are either linear or contain only ring unsaturation, the importance of which will become clear from the description below.

Belgian Pat. No. 672,846 describes a flame retardant for polymeric compositions having the general formula:

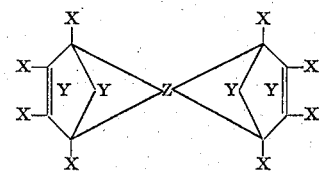

where X is bromine, chlorine, or fluorine; Y is bromine, fluorine, chlorine, alkyl or alkoxy radicals; and Z is a tetravalent cyclic hydrocarbon radical containing at least five carbon atoms.

In the Belgian specification each example of the reactant forming the Z radical is characterized by dual unsaturation confined to the ring system. In contrast, applicant's class of dienophiles may be regarded as having a divalent cyclic part and a divalent linear part, 4-vinyl-1-cyclohexene being the most important examples.

In U.S. Pat. No. 2,900,377, issued to E. K. Fields on Aug. 18, 1959, there is described an example (Example V) in which equimolar proportions of 1-vinyl cyclohexene-3 (i.e., 4-vinyl-1-cyclohexene) are reacted with hexachlorocyclopentadiene. It is clear from this example, however, that only 1:1 molar adducts were formed by this reaction. Other examples cited in the Fields' patent include d,1-limonene with hexachlorocyclopentadiene; but in this case, an excess molar proportion of d,1-limonene was used as the reactant and accordingly, only a 1:1 adduct is formed.

The novelty and utility of this invention resides in the fact that the subject compositions are prepared by reacting 2 moles of halogenated cyclopentadiene with 1 mole of diene (e.g., 4-vinyl-1-cyclohexene) that has partly linear unsaturation (e.g., with one vinyl group) and partly cyclic unsaturation (e.g., with one cyclohexene double bond). In this manner, a norbornene methanonaphthalene compound results with a freely rotating central single C—C bond. This novel type of compound clearly distinguishes over products formed by reacting halogenated cyclopentadiene with (1) cyclic diene (which are discussed at length in the *Chemical Reviews* article and the Belgian patent cited above) and with (2) linear dienes (e.g., butadiene, as discussed in cited *Chemical Reviews* article).

In blending the compositions to improve the flame retardant properties of plastics, it has been found that it is only necessary to use about 1 to 30 percent by weight of the additive and ordinarily only 5 to 25 percent by weight. Up to 50 percent of the additive may be used. As an incidental benefit, these compositions also improve other certain physical properties, i.e., the brittleness is diminished, elasticity is improved, and color holding properties are also enhanced.

Accordingly, it is a principal object of the invention to provide novel compositions of matter having the general formula:

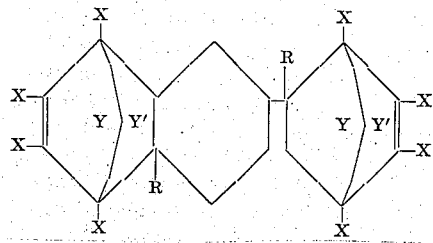

where X is halogen; Y and Y' are each selected from the group consisting of halogen, lower (1-4C) alkyl, lower (1-4C) alkoxy, and halogen substituted lower (1-4C) alkoxy and alkyl radicals; and R is selected from the group consisting of H, lower (1-4C) alkyl, and halogen radicals.

Additional objects and advantages will be apparent from reading the following detailed description.

DESCRIPTION

With reference to the general class of compounds described above, a very special case of these formulations is where both the X and Y radicals are halogen and, more specifically, chlorine. This compound, which has the systematic name: 6-(1',4',5',6',7',7'-hexachloro-5'-norbornen-2'-yl)-1,2,3,4,9,9-hexachloro-1,4,4a,5,6,7,8,8a-oxtahydro-1,4-methanonaphthalene. It is formed by the Diels-Alder reaction referred to above; and more specifically it is the reaction product of 2 moles of hexachlorocyclopentadiene with 1 mole of 4-vinyl-1-cyclohexene.

The reaction times generally range between about 4 hours to about 30 hours. The temperature of the reaction ranges between about 100° centigrade to about 200° centigrade.

Other compounds which can be formed in the Diels-Alder reaction are as follows:

1. Reaction product of limonene and hexachlorocyclopentadiene

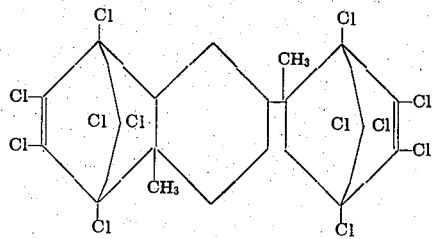

2. Reaction product of 4-vinyl-1-cyclohexene and 1,1-dimethoxy-2,3,4,5-tetrachlorocyclopentadiene.

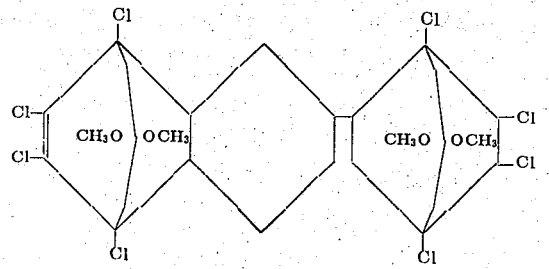

3. Reaction product of hexabromocyclopentadiene and 4-vinyl-4-cyclohexene.

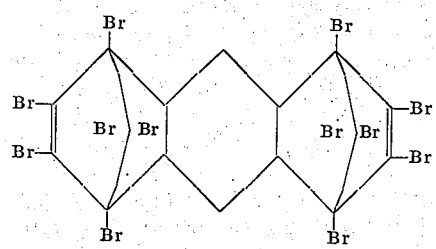

4. Reaction product of 1-($\beta$-chloroethyl) pentachlorocyclopentadiene and 4-vinyl-1-cyclohexene.

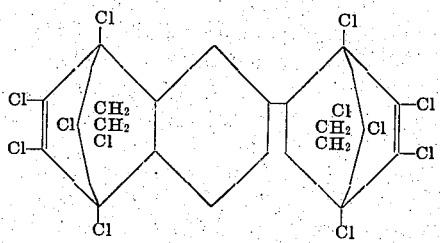

5. Reaction product of 4-($\alpha$-chloro-vinyl)-1-chloro cyclohexene and hexachlorocyclopentadiene.

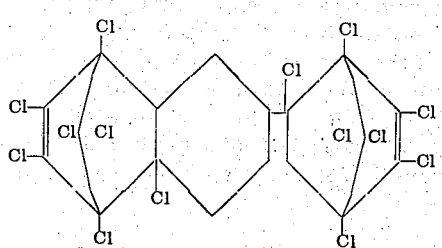

The polymers embraced within the scope of this invention include the homopolymers and copolymers of unsaturated aliphatic, alicyclic and aromatic hydrocarbons. Suitable monomers are ethylene; propylene; butene; pentene; hexene; heptene; octene; 2-methylpropene-1; 3-methylbutene-1; 4-methylpentene-1; 4-methylhexene-1; 5-methylhexene-1; bicyclo-(2.2.1)-2-heptene; butadiene; pentadiene; hexadiene; isoprene; 2,3-dimethyl-butadiene-1,3; 2-methyl-1,3-pentadiene; 4-vinylcyclohexene; vinylcyclohexene; cyclopentadiene; styrene and methylstyrene, and the like.

Other polymers in addition to the above-described olefin polymers that are useful in the invention include polyindene, indenecoumarone resins; polymers of acrylate esters and polymers of methacrylate esters, acrylate and methacrylate resins such as ethyl acrylate, n-butyl methacrylate, isobutyl methacrylate, ethyl methacrylate and methyl methacrylate; alkyd resins and paint vehicles, such as bodied linseed oil; cellulose derivatives such as cellulose acetate, cellulose acetate butyrate, cellulose nitrate, ethyl cellulose, hydroxyethyl cellulose, methyl cellulose and sodium carboxymethyl cellulose; epoxy resins; furan resins (furfuryl alcohol or furfuralketone); hydrocarbon resins from petroleum; isobutylene resins (polyisobutylene); isocyanate resins (polyurethanes); melamine resins such as melamine-formaldehyde and melamine-urea-formaldehyde; oleoresins; phenolic resins such as phenol-formaldehyde, phenolic-elastomer, phenolic-epoxy, phenolic-polyamide, and phenolic-vinyl acetals; polyamide polymers, such as polyamides, polyamide-epoxy and particularly long chain synthetic polymeric amides containing recurring carbon amide groups as an integral part of the main polymer chain; polyester resins such as unsaturated polyesters of dibasic acids and dihydroxy compounds, and polyester elastomer and resorcinol resins such as resorcinol-formaldehyde, resorcinol-furfural, resorcinol-phenol-formaldehyde, resorcinol-polyamide and resorcinol-urea; rubbers such as natural rubber, synthetic polyisoprene, reclaimed rubber, chlorinated rubber, polybutadiene, cyclized rubber, butadiene-acrylonitrile rubber, butadiene-styrene rubber, and butyl rubber; neoprene rubber (polychloroprene); polysulfides (Thiokol); terpene resins; urea resins; vinyl resins such as polymers of vinyl acetal, vinyl acetate or vinyl alcohol-acetate copolymer, vinyl alcohol, vinyl-alcohol, vinyl chloride, vinyl butyral, vinyl chloride-acetate copolymer, vinyl pyrrolidone and vinylidene chloride copolymer; polyformaldehyde; polyphenylene oxide; polymers of diallyl phthalates and phthalates; polycarbonates of phosgene or thiophosgene and dihydroxy compounds such as bisphenols, phosgene, thermoplastic polymers of bisphenols and epichlorohydrin (trade named Phenoxy polymers); graft copolymers and polymers of unsaturated hydrocarbons and an unsaturated monomer, such as graft copolymers of polybutadiene, styrene and acrylonitrile, commonly called ABS resins; ABS-polyvinyl chloride polymers, recently introduced under the trade name of Cycovin; and acrylic polyvinyl chloride polymers, known by the tradename of Kydex 100. Also included in the polymers that may be employed are poly(cyclopentadiene) acrylic rubber, polycarbonate and high impact poly-styrene.

The polymers of the invention can be in various physical forms, such as shaped articles, for example, molding, sheets, rods, and the like; fibers, coatings, films and fabrics, and the like.

The halogenated Diels-Alder adducts in the present composition are desirably incorporated in the polymeric materials in an effective fire retardant amount. Generally, halogenated Diels-Alder adducts in the amount of from about 20 to about 50 percent by weight of the polymeric composition and desirably from about 5 to about 40 percent by weight of the polymeric composition and preferably from about 10 to 35 percent by weight are mixed with polymeric composition. Improved fire retardance can be provided by incorporating metallic compounds, wherein the metal is selected from the group consisting of antimony, arsenic and bismuth, in the polymeric compositions in the amount of about 1 to about 30 percent by weight of said polymeric composition, preferably about 2 to 25 percent.

Antimony oxide is the antimony compound that is presently preferred for use in the present invention. However, many antimony compounds are suitable. Suitable antimony compounds include the sulfides of antimony, salts of the alkali metals of Group I of the Periodic Table, antimony salts of organic acids and their pentavalent derivatives and the esters of antimonious acids and their pentavalent derivatives. It is convenient to use sodium antimonite or potassium antimonite when it is desired to use an alkali metal salt of the antimony for compositions of this invention. U.S. Pat. No. 2,996,528 discloses suitable antimony salts of organic acids and their pentavalent derivatives. Compounds of this class include antimony butyrate, antimony valerate, antimony caproate, antimony heptylate, antimony caprylate, antimony pelargonate, antimony caprate, antimony cinnamate, antimony anisate and their pentavalent dihalide derivatives. Likewise, the esters os antimonious acids and their pentavalent derivatives disclosed in U.S. Pat. No. 2,993,924 such as tris(n-octyl) antimonite, tris(2-ethylhexyl) antimonite, tribenzyl antimonite, tris(beta-chloroethyl) antimonite, tris(beta-chloropropyl) antimonite, tris(beta-chlorobutyl) antimonite, and their pentavalent dihalide derivatives. Still other suitable organic antimony compounds are the cyclic antimonites such as trimethylol propane antimonite, pentaerythritol antimonite and glycerol antimonite. The corresponding arsenic and bismuth compounds can also be employed in particular the oxides of arsenic and bismuth.

The components comprising the compositions of the instant invention can be mixed by any one of several methods. The additives can be introduced into the polymer while the latter is dissolved in a suitable solvent. This procedure is especially useful when it is desired to mix the additives during the polymer manufacturing process. When the polymer is subsequently recovered from the solvent, the additives are intimately mixed with the polymer. Usually, the additives are mixed with the polymer in the molten state at temperatures that can range from the melting point to the decomposition temperature of the polymer, e.g., from 70° to 600° centigrade. Alternatively, the additives and polymer are dry-blended in the finely divided state so that an intimate mixture is obtained upon subsequent molding or extrusion.

EXAMPLE I

A 1 liter flask equipped with a stirrer, condenser and thermometer was charged with 605 g. (2.2 moles) of hexachlorocyclopentadiene, 108 g. (1.0 mole) of 4-vinylcyclohexene and 166 g. of mineral spirits. The apparatus was maintained under a positive nitrogen pressure and slowly heated to a reaction mixture temperature of190°C. The temperature was maintained between 190° and 197°C. for 4 hours and then allowed to cool to room temperature. The solids which separated on cooling were filtered off and washed with xylene. After washing the solid with ethanol 196 g. were obtained with a melting point of 225°–244°C. Calculated for $C_{18}H_{12}Cl_{12}$: 65.1% Cl. Found: 65.0%Cl.

EXAMPLE II

A 2 liter flask equipped with a thermometer, stirrer and reflux condenser was charged with 900 g. (3.3 moles) of hexachlorocyclopentadiene, 184 g. (1.7 moles) of 4-vinylcyclohexene and 15 mg. of Ethyl Corporation's antioxidant 702 [4,4'-methylene bis(2,6-ditert butylphenol)]. The reaction mixture was slowly heated to 160°C. at which temperature a moderate exotherm was evident. The temperature was then maintained at 159°–163°C. for 24 hours. When the reaction mixture was allowed to cool to room temperature it solidified. An oil bath was used to bring the temperature back to 140°C. and 165 g. of mineral spirits added to the reaction mixture. After cooling to room temperature the product was filtered off and washed three times with 450 ml. portions of mineral spirits. The product was purified by two recrystallizations from xylene followed by washing of the solid with hexane to give the product with a melting point of 222°–223°C. Calculated for $C_{18}H_{18}Cl_{12}$: 65.1% Cl. Found: 65.5% Cl.

EXAMPLE III

A three liter flask equipped with a stirrer, thermometer and reflux condenser was charged with 990 g. (3.6 moles) of hexachlorocyclopentadiene, 162 g. (1.5 moles) of 4-vinylcyclohexene and 15 mg. of Ethyl Corporation's antioxidant 702 [4,4'-methylene bis(2,6-di-tert butyl phenol)]. The reaction mixture was heated to and then held at 165°–175°C. for 27 hours. The mixture was then cooled to 5°–10°C. and filtered. The solid obtained was washed with 4 × 500 ml. portions of hexane and then dried at 110°C. The product was obtained in about a 70 percent yield.

EXAMPLE IV MIGRATION TESTING

Pencil rod moldings were prepared from a 10 gram mixture of 55 percent polypropylene, 35 percent fire retardant additive and 10 percent antimony oxide. The polypropylene compositions were dry-blended in a Wyle mill and charged into 7 millimeter glass tubes.

Pencil rod moldings were prepared by heating the polypropylene compositions under pressure in a molten salt bath.

Duplicate pencil rods for the fire retardant composition were heated aged for 90 days at 120° centigrade. Weight losses calculated as percent of fire retardant additive present in the unaged pencil rods are tabulated in the table listed below:

| Days at 120 Degrees C. | Di-Adduct of Hexachlorocyclopentadiene and 4-vinyl-1-cyclohexene |
|---|---|
| 4 | 0.96 |
| 7 | 1.45 |
| 14 | 2.35 |
| 21 | 3.46 |
| 35 | 5.13 |
| 42 | 6.03 |
| 56 | 8.27 |
| 70 | 9.80 |
| 84 | 12.1 |
| 91 | 12.8 |

EXAMPLE V

Evaluation of Adducts in Thermoplastic

The di-adduct of hexachlorocyclopentadiene and 4-vinylcyclohexene was evaluated as listed below in various thermoplastics. The ingredients employed were: (a) polypropylene, General Purpose, supplied in powder form by Avisun as product No. 1014; (b) polystyrene, General Purpose, supplied by Monsanto Chemical Corporation in pellet form as Hi Flow 77; (c) polyethylene, Low Density, supplied in pellet form by E.I. DuPont as Alathon 5B; (d) Acrylonitrile-butadiene-styrene (ABS) copolymer supplied in powder form by Marbon Corporation as Blendex 101; (e) antimony trioxide, supplied in powder form (1 micron) by M & T Chemical Corporation as Thermoguard "S."

Compounding

Commercial molding pellets of polystyrene and polyethylene (sources listed above) were ground to approximately 20 mesh size powder. The hexachlorocyclopentadiene di-adduct of 4-vinylcyclohexene was micropulverized to about 5 micron particle size. The powders were blended in a twin shell tumble blender in following weight percent ratios:

|  |  | Di-Adduct | $Sb_2O_3$ |
|---|---|---|---|
| Polyethylene | 60% | 27% | 13% |
| Polypropylene - a | 60% | 27% | 13% |
| Polypropylene - b | 60% | 40% | — |
| ABS - a | 70% | 22% | 8% |
| ABS - b | 60% | 40% | — |
| Polystyrene | 80% | 15% | 5% |

Extrusion Blending

The dry blended powder formulations were then further compounded by extrusion. In addition this step also provides molding pellets of conventional form by chopping the produced extrudate strands. The extruder used was a ¾ inch single screw Brabender having a 20:1 L/D ratio operating at 100 RPM at 325°F. for both barrel zones and the ⅛ inch diameter single strand die. For polyethylene, however, the temperatures were 300°F., but the other conditions remained the same.

Injection Molding

The above produced pellets were molded into ⅛ × ½ × 5 inch bars in a Mini-Jector plunger type injection molding machine of ⅜ ounce capacity. Polystyrene compositions were molded in a 1 ounce cylinder on the same machine to prepare ⅛ × 4 inch disks for electrical testing. Plunger pressures were variable depending on the material being molded and the cylinder used. Cylinder temperatures were 350°–450°F. for molding test specimens and up to 600°F. in some cases for evaluation of thermal stabilities. Mold temperatures were 120°F. for polypropylene and 140°F. for ABS moldings. For polyethylene moldings, the mold was not heated but allowed only to equilibriate to ambient conditions.

Testing

Mechanical, electrical and flammability testing was conducted according to ASTM procedures as indicated. Oven aging was conducted under laboratory recognized procedures. All tests were performed in triplicate (minimum) except some electrical testings which were performed in duplicate only.

Oven aging test determines the amount of loss of the composition during an extended period at a particular temperature. The test measures the stability of the composition.

Results

Results obtained are listed and compared to controls in Tables I, II and III.

TABLE I

MECHANICAL PROPERTIES OF THERMOPLASTIC COMPOSITIONS
CONTAINING HEXACHLOROCYCLOPENTADIENE DIADDUCT OF
4-VINYL CYCLOHEXENE

| Compositions % By Weight | | | TEST ASTM D758-48 Notched IZOD Impact Strength Ft. lbs./in. notch | ASTM D-638-64T | | | | ASTM D-790-60 | |
|---|---|---|---|---|---|---|---|---|---|
| | | | | Tensile Strength (PSI) | | Elongation % | | Flexual Properties | |
| | | | | Yield | Break | At Yield | At Break | Yield Strength (PSI) | Modules (PSI) |
| I | Polystyrene | – 80% | 0.55 | — | 4310 | — | 1.2 | 14,000 | $5.25 \times 10^5$ |
| | Diadduct | – 15% | | | | | | | |
| | $Sb_2O_3$ | – 5 % | | | | | | | |
| II | Polystyrene | – 100% | 0.76 | — | 7940 | — | 3.3 | 16,730 | $9.6 \times 10^5$ |
| III | Polyethylene | – 60% | Too Soft | — | 1630 | — | 80.5 | 1,127 | $1.99 \times 10^4$ |
| | Diadduct | – 27% | | | | | | | |
| | $Sb_2O_3$ | – 13% | | | | | | | |
| IV | Polyethylene | – 100% | Too Soft | — | 2150 | — | 55.8 | 1,100 | $2.3 \times 10^4$ |
| V | Polypropylene | – 60% | 0.43 | 4520 | 4110 | 4.9 | 9.6 | 8,540 | $3.10 \times 10^5$ |
| | Diadduct | – 27% | | | | | | | |
| | $Sb_2O_3$ | – 13% | | | | | | | |
| VI | Polypropylene | – 100% | 0.95 | 5330 | 2300 | 7.7 | 45.2 | 9,290 | $2.6 \times 10^5$ |
| VII | ABS | – 70% | 4.64 | 5460 | 4240 | 4.1 | 22.6 | 8,730 | $2.70 \times 10^5$ |
| | Diadduct | – 22% | | | | | | | |
| | $Sb_2O_3$ | – 8% | | | | | | | |
| VIII | ABS | – 100% | 7.43 | 5724 | 4510 | 4.2 | 12.0 | 9020 | $2.50 \times 10^5$ |

| Test Compositions | ASTM D-648-56 Heat Deflection °C. | | Hardness | |
|---|---|---|---|---|
| | | | ASTM D-2240-68 | ASTM D-785-65 |
| | At 66 PSI | At 264 PSI | Shore D | Rockwell L |
| I | 80.2 | 74.8 | 92.4 | 101.4 |
| II | 89.3 | 80.3 | 84.6 | 98.2 |
| III | 39.8 | Too Soft | 51.6 | Too Soft |
| IV | 46.0 | Too Soft | 51.6 | Too Soft |
| V | 71.0 | 48.8 | 77.2 | 51.8 |
| VI | 105.7 | 56.7 | 78.0 | 64.6 |
| VII | 79.7 | 72.7 | 76.8 | 23.8 |
| VIII | 91.5 | 79.7 | 78.8 | 39.4 |

TABLE II

OTHER PROPERTIES OF THERMOPLASTIC
COMPOSITIONS CONTAINING HEXACHLORO-
CYCLOPENTADIENE DIADDUCT 4-VINYL
CYCLOHEXENE

| Compositions % By Weight | | | D-635 Flame Test Modified for Pencil Rod Moldings | | | | Oven Aging % Change in Wt. | |
|---|---|---|---|---|---|---|---|---|
| | | | F.O.* Sec. | A.G.* Sec. | Drip | Temp. °C. | 500 Hrs. | 1,000 Hrs. |
| I | Polystyrene | – 80% | >21.2 | >38 | none | 80 | –0.100 | –0.102 |
| | Diadduct | – 15% | | | | | | |
| | $Sb_2O_3$ | – 5% | | | | | | |
| II | Polystyrene | – 100% | — | — | — | 80 | –0.053 | –0.63 |
| III | Polyethylene | – 60% | 2.0 | 0 | none | 80 | –0.061 | –0.078 |
| | Diadduct | – 27% | | | | | | |
| | $Sb_2O_3$ | – 13% | | | | | | |
| IV | Polyethylene | – 100% | — | — | — | 80 | –0.12 | –0.12 |
| V | Polypropylene | – 60% | 2.0 | 32 | none | 120 | –1.69 | –3.15 |
| | Diadduct | – 27% | | | | | | |
| | $Sb_2O_3$ | – 13% | | | | | | |
| VI | Polypropylene | – 100% | — | — | — | 120 | –0.58 | –0.66 |
| VII | ABS | – 70% | 1.6 | 14 | none | 80 | –0.17 | –0.15 |
| | Diadduct | – 22% | | | | | | |
| | $Sb_2O_3$ | – 8% | | | | | | |
| VIII | ABS | – 100% | — | — | — | 80 | –0.24 | –0.28 |
| IX | Polypropylene | – 60% | 44.2 | 3 | none | | | |
| | Diadduct | – 40% | | | | | | |
| X | ABS | – 60% | 6.2 | 0 | none | | | |
| | Diadduct | – 40% | | | | | | |

*F.O. = Flame out
*A.G. = After glow

TABLE III

ELECTRICAL PROPERTIES OF THERMOPLASTIC COMPOSITIONS CONTAINING HEXACHLOROCYCLOPENTADIENE DIADDUCT OF 4-VINYL CYCLOHEXENE

| Electrical Tests | | Units | Polystyrene - 80% Diadduct - 15% $Sb_2O_3$ - 5% | Control 100% Polystyrene |
|---|---|---|---|---|
| Volume Resistivity | | ohm-cm. | ∞ or > $2.5 \times 10^{14}$ | ∞ or > $2.5 \times 10^{14}$ |
| Surface Resistivity | | ohm-cm. | ∞ or > $2.5 \times 10^{14}$ | ∞ or > $2.5 \times 10^{14}$ |
| Dielectric Constant at | 60Hz | — | 2.39 | 2.42 |
| | $10^3$Hz | — | 2.38 | 2.42 |
| | $10^6$Hz | — | 2.43 | 2.43 |
| Dissipation Factor at | 60Hz | — | < 0.0005 | < 0.0005 |
| | $10^3$Hz | — | < 0.0005 | < 0.0005 |
| | $10^6$Hz | — | 0.0014 | 0.0004 |
| Dielectric Str. S/S | | v./mil | 406 | 464 |
| Dielectric Str. S/S | | v./mil | 425 | 489 |
| Arc. Resistance | | secs. | 25.6 | 101.0 |

What is claimed is:

1. A compound of the formula:

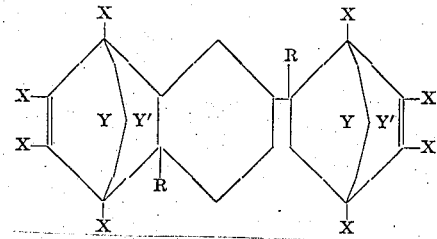

in which X is halogen; Y and Y' are each selected from the group consisting of halogen, lower alkyl, lower alkoxy, halogen substituted lower alkyl and halogen substituted lower alkoxy radicals; and R is selected from the group consisting of hydrogen, lower alkyl, and halogen radicals, wherein said lower alkyl and lower alkoxy range from 1 to 4 carbon atoms each.

2. A compound as defined in claim 1 in which X is selected from the group consisting of chlorine, bromine, and fluorine.

3. A compound as defined in claim 2 wherein X is chlorine; Y and Y' are chlorine; and R is hydrogen.

4. A compound as defined in claim 2 in which R is hydrogen.

* * * * *